L. W. BOYNTON.
Making Cube Sugar.
No. 45,579.
Patented Dec. 27, 1864.
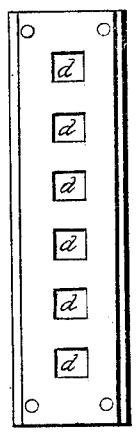
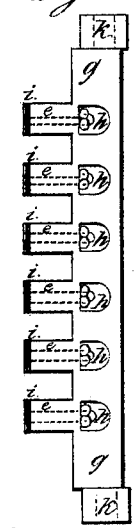
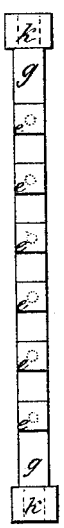
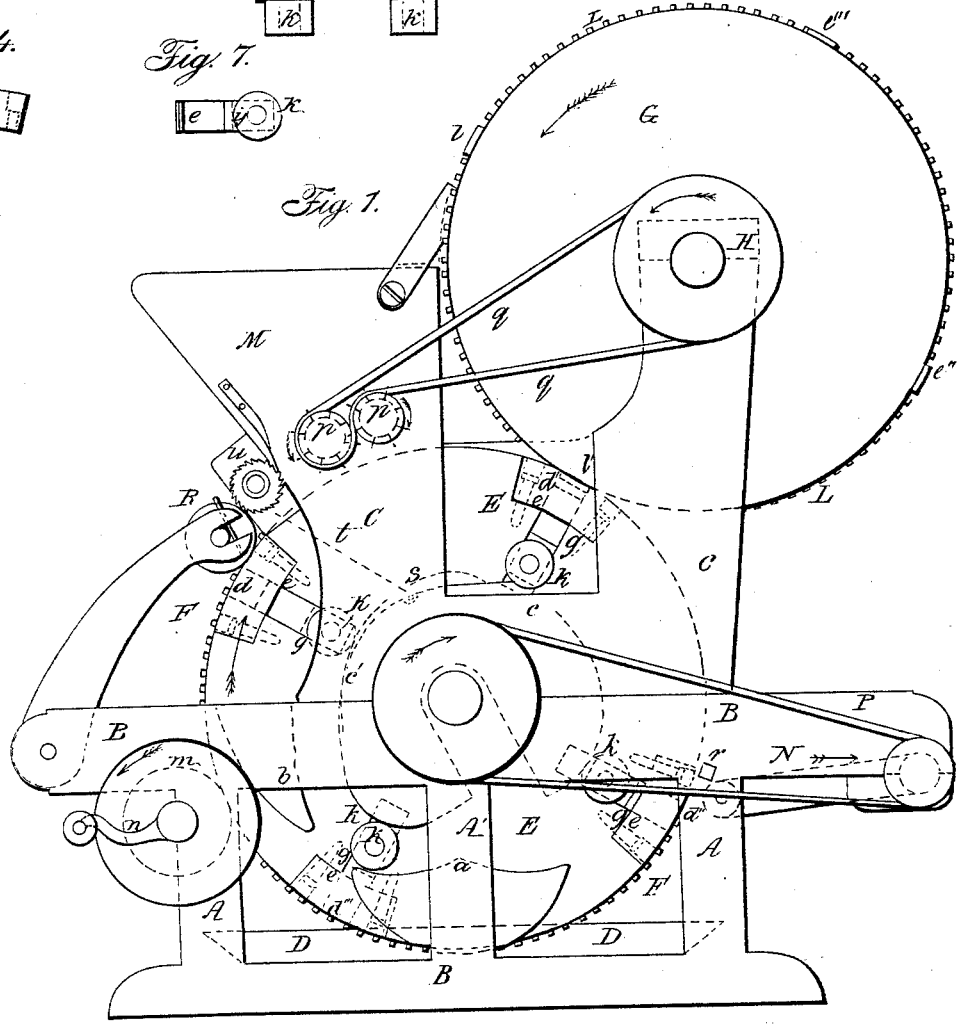

UNITED STATES PATENT OFFICE.

LEANDER W. BOYNTON, OF HARTFORD, CONNECTICUT.

IMPROVEMENT IN MACHINES FOR MOLDING SUGAR FOR TABLE USE, &c.

Specification forming part of Letters Patent No. 45,579, dated December 27, 1864; antedated December 15, 1864.

*To all whom it may concern:*

Be it known that I, LEANDER W. BOYNTON, of Hartford, in the county of Hartford and State of Connecticut, have invented a new and useful Improvement in Machines for Molding Sugar for Table Use, &c.; and I do hereby declare that the following is a full, clear, and exact description of the construction, character, and operation of the same, reference being had to the accompanying drawings, which make part of this specification, in which—

Figure 1 is a plan of the machine taken at right angles to the axes of the cylinders, showing partially in dots the shapes of the cams, &c. Fig. 2 is a longitudinal plan of one of the movable segments of the main cylinder, (as from its inside,) showing the cavities or mortises in which the plungers work. Fig. 3 is an edge view of the same as Fig. 2. Fig. 4 is an end view of the same as Fig. 2. Fig. 5 is a longitudinal plan of one row of plungers ready to be placed in the spaces or mortises of Figs. 2, 3, and 4, showing the anti-friction rollers which work on the faces of the cams. Fig. 6 is a longitudinal plan of the same when looking toward the ends of the plungers. Fig. 7 is a plan or end view of Fig. 5.

My improvement consists in fitting a series of rows or ranks of pistons or plungers into radiating spaces, cavities, or mortises in the periphery or convex surface of a hollow cylinder in such a manner that by the action of suitable cams attached to the inside of the frame on each side (or at each end of the main cylinder) each of these rows of plungers or pistons will be drawn inward, so as to leave open spaces in the convex surface of the main cylinder to receive the crushed or pulverized sugar from the hopper, as by the revolution of the cylinder they pass under it, and so that when the row of spaces or their orifices arrive at the point where the projections on the upper cylinder mesh into or enter them the sugar will be pressed into blocks sufficiently solid to bear any ordinary handling for packing and transportation; and so that while the main cylinder is revolving the plungers will (by the effect of the cams on the plungers) throw out the molded blocks onto an endless apron, which will remove them from the machine to some suitable receptacle; and so that while revolving the plungers will (by the effect of the cams) be drawn inward, so as to allow the spaces or molds, while passing through the trough or vat, to fill with warm water to dissolve any adhering sugar, and the plungers be again forced outward by the cams, so as to scrape the sides of the cavities clean and be again drawn inward, ready to receive another charge before arriving under the hopper.

I make the frame of posts A A', &c., bars or beams B B, &c., and sides C C, &c., which serve as supports for the bearings, cams, vat, &c. On the lower bars or bottom of the frame I set or erect a vat or trough, as indicated at D D, in which I keep a supply of warm water, (heated by steam or otherwise,) through which the lower portion of the main cylinder passes, to wash the cavities or molds, as hereinafter described. On the central post, A', on each side of the frame, I secure a cam, the upper surface or face of which is shaped and located as indicated partially by dots at $a$, and on the upper bar or beam, B B, on each side of the frame, (on the inner side,) I secure a cam, the inner surface or face of which is shaped and located as indicated partially by dots at $b$; and in the central part, on each side of the frame, I secure a cam whose outer surface or face is shaped and located as indicated mostly by dots at $c$ and $c'$, all as represented in Fig. 1. Each pair of these cams serve to give a positive motion to the rows or ranks of pistons or plungers, hereinafter described, toward or from the center.

I make the main cylinder E E of white-metal or any other suitable material; and I make it hollow, with the shell or periphery of sufficient thickness to serve for the depth of the cavities or molds hereinafter described; and I make a series of movable longitudinal segments or parts, as differently shown in Figs. 1, 2, 3, and 4, in which I make the cavities, as $d\ d$, &c., which serve as molds, and in which the pistons or plungers work; and I secure these segments in place by screws, as indicated in Figs. 1 and 4, when the main cylinder will be complete. The journals of the axis of this main cylinder rest in bearings on the upper beams, B B, &c., and on the journal at the rear end I secure a gear-wheel, as indicated at F F.

I make each row or tier of pistons or plungers of a bar of white-metal or any other suitable material, substantially in the form shown in the three plans, Figs. 5, 6, and 7. I make the plungers or pistons $e\ e$, &c., to fit the spaces or mortises $d\ d$, &c., Figs. 1, 2, 3, and 4. In the bar part $g$, I cast or cut spaces, as shown at $h\ h$, &c., and on the end of each piston $e$, I place a piece of india-rubber, or some other suitably elastic substance, as shown at $i\ i$, &c., Figs. 5 and 7, to wipe the molds, which I cap with a piece of white-metal, as indicated in Figs. 5 and 7. I make this cap as the head of a screw-bolt, and I drill a hole lengthwise through the piston, as indicated by dots, near $e$ in Fig. 5, and pass the screw-bolt through and turn on a nut near $h$, all as shown (partially in dots) in Fig. 5, or I pass the bolt entirely through the bar and turn on the nuts at the back, when the row or bar of plungers will be complete and ready to be inserted into its place in Fig. 2. I make this bar $g$ a little longer than the main cylinder, and on each end I place an anti-friction roller, as shown at $k\ k$, Figs. 5 and 6, and at $k$, Figs. 1 and 7. These square ends pass loosely through slots cut in the heads of the main cylinder, as indicated at $g\ g\ g\ g$, Fig. 1, and the anti-friction rollers $k\ k$ work on the faces of the cams $a\ b$ and $c\ c'$, as shown partially in dots in Fig. 1, to work the plungers in and out at the proper time to effect the purposes designed.

I make the upper cylinder, G, of the same size as and similar to the main cylinder, (except the movable parts and their appendages,) with a series of rows of projections on its convex surface, parallel to the axis of the cylinder and to each other, as shown at $l$, $l'''$, and $l''$, and indicated (partially by dots) at $l'$, Fig. 1. I make these projections of the same number, size, and shape as the faces for the plungers $e\ e$, &c., before described, and so arrange them that when the two cylinders are revolving the projections $l$, $l'''$, and $l''$ will regularly fall into the orifices of the mortises or molds (in which the plungers work) in the main cylinder, as indicated by dots at $l'$, Fig. 1. The journals of the axis of this cylinder G revolve in bearings in the upper part of the frame, as indicated by dots at H; and on the journal on the rear end, and outside of the case, I secure a gear-wheel, as indicated at L L, of the same number and pitch of teeth as the wheel F F on the journal of the main cylinder, and I warm this cylinder G by steam passing in and out through its journals. To revolve the geared wheels, and consequently the two cylinders, I use a pinion (which is indicated by dots at $m$) on the rear end of the arbor to which the crank $n$ is attached, or by any other convenient means.

Above the main cylinder and toward the left hand I fit a suitable hopper, M, to receive the crushed or pulverized sugar, to which the convex surface of the main cylinder forms a bottom, so that the sugar will at all times fall into the before-described cavities or molds in the cylinder, to be pressed or molded into blocks, and the surplus will be stricken off by the lower edge of the right-hand side of the hopper as the orifices of the mold pass under it; and at the top of this hopper I fit a swinging piece whose edge will scrape any adhering sugar from the faces of the projections $l$, &c., on the upper cylinder and allow it to fall into the hopper; and in this hopper I use two or more spurred rollers or arbors, as indicated at $p$ and $p$, which will support the varying weight of the superincumbent sugar, and by being revolved by the band $q\ q$ will keep the sugar loose, so that it will fill the cavities or molds alike at all times.

At the left-hand end of the machine I fit a swinging wiper, R, to wipe or sponge the moisture from the surface of the main cylinder after passing through the vat, and before it arrives at the hopper.

At the right-hand end of the machine I use an endless apron, as indicated at N, which is revolved or worked by the band P and serves to carry the blocks of sugar (as they are pushed out of the molds by the plungers and fall over the guard-bar $r$) to a receiver.

To insure the requisite degree of pressure on the sugar while in the molds to give it the required degree of solidity, and yet not be in danger of straining the machine, I attach to the cams $c\ c'$, (on each side of the frame,) on the portion which is under the hopper, an adjustable portion or face, as indicated at $s$, which I secure to the face of the cams, near $c'$, by a joint, or I make $s$ elastic, so that by its gravity or elasticity it will naturally rest against the permanent face of the cam and allow the plungers to descend, so that the cavities will receive the largest quantity of sugar which can ever be required, and when less is required the adjustable portion or face $s$ may be raised and adjusted by the cords $t$ winding on the arbor of the ratchet-wheel $n$.

Having constructed the several parts and arranged them as above described, having warm water in the vat D D, and having put the crushed or pulverized sugar into the hopper, I put the machine in motion by turning the crank $n$ in the direction indicated by the dart on the pulley, which will, by means of the pinion, (indicated by the dots at $m$,) revolve the two geared wheels, and consequently the two cylinders. When the main cylinder E E is in the position shown in Fig. 1, the anti-friction rollers, as $k$, of one of the rows or ranks of the plungers $e$ will rest upon the least prominent portion of the cam $c\ c'$ near $c'$, and the spaces or molds $d\ d$, &c., will be deep and ready to receive large charges of the crushed or pulverized sugar as they pass under the hopper M. When the row arrives at the position of $d'$, the anti-friction rollers come upon a pointed prominence of the cam, which elevates the plungers $e\ e$, &c., to the position indicated by black dots, while at the same time the upper cylinder, G, having revolved from $l$ to $l'$, will force its projections into the orifices of the molds $d\ d$, &c., to the extent indicated by the red dots, so that the sugar in the mold will be compressed to the thickness shown between the black and red dots at $d'$, when it should be of the proper solidity for handling for the purpose of packing, transportation, &c.; and the degree of the solidity may be determined or adjusted to the greatest exactness by allowing the exact quantity of sugar required to enter and remain in the molds when their orifices leave the hopper by the adjustment of the faces $s$ of the cams, as the crushed or pulverized sugar may require more or less condensation, to be determined only by trial. When the main cylinder has revolved about seventy degrees farther, when the orifices are but a little above the guard-bar $r$, the effect of the cams will have caused the plungers, as indicated at $d''$, to force the blocks of sugar entirely out of the molds, when they will fall over the bar $r$ onto the endless apron N, and be carried to a suitable receiver. The guard-bar $r$ prevents the blocks passing. When the main cylinder, in its revolution, brings the anti-friction-rollers to the cams $a$, the plungers will be forced inward to the greatest extent, so as to allow the warm water in the vat D D to fill the molds and dissolve any sugar which may have adhered to their sides; and when the row of plungers have arrived at the position $d'''$ another prominent portion of the cams $c\ c'$ will have forced the plungers outward to the orifices, as indicated at $d'''$, and thus scraped and wiped the sides of the molds clean; and as the cylinder passes on in its revolution the cams $b$ will force the plungers inward again to the position indicated at $d$, when all will be ready for a new revolution, &c., as the roller R will have absorbed all the moisture from the surface of the cylinder before it reaches the hopper M for a new charge.

There may be as many rows or tiers of plungers as the convex surface of the cylinder will admit, and as many plungers in each tier as the length of the cylinder will admit, and the molds may be made of any desired form in their cross-section, and of any required depth, so as to mold anything, from cubic blocks of sugar for tea or coffee to the thinnest confects, and of every shape, and several sets of plungers may be used in the same machine, differing only in length to make blocks or pieces of different thicknesses, and by making the projections on the cylinder G changeable the blocks may be made of any shape.

I am aware that G. A. Jasper, on the 12th day of May, 1863, obtained a patent for apparatus for the manufacture of cube-sugar, and that on the 9th day of June, 1863, W. H. Whitmore obtained a patent for an improvement on the above; therefore I do not claim any part or combination claimed or set forth by either of the above in their respective patents; but

What I claim as my invention, and desire to secure by Letters Patent, is—

1. The main cylinder, (with its movable segments containing the cavities or molds,) in combination with the rows or bars of plungers, when the whole is constructed, arranged, and fitted for use substantially as herein described.

2. The main cylinder and its series of plungers, in combination with the upper cylinder armed with its series of projections, when they are constructed and fitted to produce the result substantially as herein described.

3. The main cylinder and its series of plungers, in combination with the anti-friction rollers and cams, when they are constructed, arranged, and fitted to operate substantially as herein described.

4. The combination of the main cylinder and its appendages with the vat and absorbing-roller, when arranged and used substantially as herein described.

5. The adjustable cams $s$ and ratchet-wheels and cords, in combination with the hopper, when so constructed and arranged as to regulate the quantity of sugar in the molds, substantially as herein described.

6. The hopper, in combination with the spurred rollers $p\ p$, when those rollers serve to support the superincumbent weight of the sugar in the hopper, so as to prevent unequal pressure on the surface of the main cylinder, as herein described.

L. W. BOYNTON.

Witnesses:
R. FITZGERALD,
W. W. O. WILCOX.